US006779852B2

United States Patent
Van Houten et al.

(10) Patent No.: US 6,779,852 B2
(45) Date of Patent: Aug. 24, 2004

(54) COMPOSITE WHEEL ASSEMBLY AND METHOD FOR PRODUCING SAME

(75) Inventors: Garry Van Houten, Middleville, MI (US); Eldean Weidmayer, Alto, MI (US); Gregory R. Hauler, Montague, MI (US)

(73) Assignee: Lacks Industries, Inc., Grand Rapids, MI (US)

( * ) Notice: Subject to any disclaimer, the term of this patent is extended or adjusted under 35 U.S.C. 154(b) by 0 days.

(21) Appl. No.: 09/837,934

(22) Filed: Apr. 19, 2001

(65) Prior Publication Data

US 2002/0153763 A1 Oct. 24, 2002

(51) Int. Cl.⁷ ................................................. B60B 7/06
(52) U.S. Cl. ................................ 301/37.43; 301/37.11; 301/37.106
(58) Field of Search .................... 301/37.101, 37.22, 301/37.23, 37.24, 37.11, 37.106, 37.107, 37.43

(56) References Cited

U.S. PATENT DOCUMENTS

| | | |
|---|---|---|
| 1,858,228 A | 5/1932 | Lyon |
| 2,158,125 A | 5/1939 | Horn |
| 2,198,056 A | 4/1940 | Lyon |
| 2,202,102 A | 5/1940 | Horn |
| 2,212,038 A | 8/1940 | Lyon |
| 2,212,039 A | 8/1940 | Lyon |
| 2,279,334 A | 4/1942 | Lyon |
| 2,281,529 A | 4/1942 | Lyon |
| 2,304,581 A | 12/1942 | Lyon |

(List continued on next page.)

OTHER PUBLICATIONS

SAE, J1986, Surface Vehicle, Issued Feb. 1993.
SAE, J1982, Wheels for Passenger Cars, Light Trucks, and Multipurpose Vehicles, Dec. 1991.

*Primary Examiner*—Russell D. Stormer
(74) *Attorney, Agent, or Firm*—VanOphem & VanOphem, P.C.

(57) ABSTRACT

A composite wheel assembly includes a wheel having a trim ring, a cladding, and a hubcap attached to the wheel. The wheel includes a disc and a rim flange circumscribing the disc with the disc and rim flange defining an outboard surface of the wheel. A trim ring mounts to and radially locates with respect to the rim flange and radially extends inward toward the disc. The cladding mounts to and radially locates with respect to the disc and radially extends outward toward the rim flange. The cladding overlaps the trim ring so that a continuous bright appearance extends across the entire outboard surface of the composite wheel assembly and so that any radial dimensional variation in the trim ring and cladding is taken up by the overlapping relationship therebetween.

18 Claims, 6 Drawing Sheets

U.S. PATENT DOCUMENTS

| | | |
|---|---|---|
| 2,308,617 A | 1/1943 | Lyon |
| 2,309,519 A | 1/1943 | Lyon |
| 2,326,788 A | 8/1943 | Lyon |
| 2,329,921 A | 9/1943 | Lyon |
| 2,345,283 A | 3/1944 | Mulhern |
| 2,358,468 A | 9/1944 | Mulhern |
| 2,361,406 A | 10/1944 | Lyon |
| 2,368,230 A | 1/1945 | Lyon |
| 2,368,236 A | 1/1945 | Lyon |
| 2,368,238 A | 1/1945 | Lyon |
| 2,368,242 A | 1/1945 | Lyon |
| 2,368,245 A | 1/1945 | Lyon |
| 2,368,246 A | 1/1945 | Lyon |
| 2,383,071 A | 8/1945 | Mulhern |
| 2,386,224 A | 10/1945 | Lyon |
| 2,386,226 A | 10/1945 | Lyon |
| 2,386,236 A | 10/1945 | Lyon |
| 2,386,240 A | 10/1945 | Lyon |
| 2,394,958 A | 2/1946 | Wood |
| 2,404,390 A | 7/1946 | Lyon |
| 2,406,390 A | 8/1946 | Lyon |
| 2,410,174 A | 10/1946 | Lyon |
| 2,411,928 A | 12/1946 | Lyon |
| 2,421,755 A | 6/1947 | Lyon |
| 2,421,756 A | 6/1947 | Lyon |
| 2,422,689 A | 6/1947 | Lyon |
| 2,426,627 A | 9/1947 | Lyon |
| 2,433,855 A | 1/1948 | Lyon |
| 2,443,626 A | 6/1948 | Lyon |
| 2,447,021 A | 8/1948 | Lyon |
| 2,478,930 A | 8/1949 | Lyon |
| 2,490,822 A | 12/1949 | Lyon |
| 2,544,705 A | 3/1951 | Lyon |
| 2,566,345 A | 9/1951 | Lyon |
| 2,579,504 A | 12/1951 | Lyon |
| 2,579,506 A | 12/1951 | Lyon |
| 2,624,638 A * | 1/1953 | Lyon |
| 2,629,635 A | 2/1953 | Lyon |
| 2,629,636 A | 2/1953 | Lyon |
| 2,631,896 A | 3/1953 | Lyon |
| 2,654,637 A | 10/1953 | Lyon |
| 2,729,512 A * | 1/1956 | Lyon |
| 2,737,421 A | 3/1956 | Lyon |
| 2,757,986 A | 8/1956 | Lyon |
| 2,846,269 A | 8/1958 | Lyon |
| 2,893,785 A | 7/1959 | Lyon |
| 2,898,149 A | 8/1959 | Lyon |
| 2,906,559 A * | 9/1959 | Lyon |
| 2,910,326 A | 10/1959 | Spisak |
| 2,926,957 A | 3/1960 | Lyon |
| 2,928,694 A | 3/1960 | Lyon, Jr. |
| 2,970,014 A * | 1/1961 | Lyon |
| 3,012,822 A | 12/1961 | Mulhern |
| 3,012,823 A | 12/1961 | Spisak |
| 3,013,639 A | 12/1961 | Lyon |
| 3,037,817 A | 6/1962 | Spisak |
| 3,480,329 A | 11/1969 | Foster et al. |
| 3,512,840 A | 5/1970 | Foster et al. |
| 3,517,968 A * | 6/1970 | Tully et al. |
| 3,669,501 A * | 6/1972 | Derleth |
| 3,724,905 A * | 4/1973 | Kachler |
| 3,726,566 A | 4/1973 | Beith |
| 3,891,276 A * | 6/1975 | Spisak |
| 4,007,967 A | 2/1977 | Buerger |
| 4,268,090 A * | 5/1981 | Rush |
| 4,720,149 A * | 1/1988 | Thissen et al. ............ 301/5.21 |
| 5,143,426 A * | 9/1992 | Todd ...................... 301/37.43 |
| 5,564,791 A | 10/1996 | Chase et al. |
| 5,595,423 A | 1/1997 | Heck et al. |
| 5,597,213 A | 1/1997 | Chase |
| 5,636,906 A | 6/1997 | Chase |
| 5,664,845 A | 9/1997 | Maloney et al. |
| 5,667,281 A | 9/1997 | Ladouceur |
| 5,820,225 A | 10/1998 | Ferriss et al. |
| 5,829,843 A | 11/1998 | Eikhoff |
| 5,842,750 A | 12/1998 | Murray et al. |
| 5,921,634 A | 7/1999 | Eikhoff |
| 6,007,158 A | 12/1999 | Maloney et al. |
| 6,152,538 A * | 11/2000 | Ferriss et al. ............ 301/37.33 |
| 6,200,411 B1 * | 3/2001 | Eikhoff et al. ....... 301/37.43 X |
| 6,209,204 B1 * | 4/2001 | Eikhoff ................ 301/37.43 X |
| 6,270,167 B1 * | 8/2001 | Kemmerer et al. ...... 301/37.43 |
| 6,386,642 B2 * | 5/2002 | Maloney et al. ......... 301/37.43 |
| 6,406,100 B1 * | 6/2002 | Kinstler ................ 301/37.101 |
| 6,481,804 B2 * | 11/2002 | Tanghetti ................ 301/37.36 |

\* cited by examiner

COMPOSITE WHEEL ASSEMBLY AND METHOD FOR PRODUCING SAME

CROSS-REFERENCES TO RELATED APPLICATIONS

Not applicable.

FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention generally relates to wheels that are equipped with decorative overlays. More specifically, the present invention relates to a composite automobile wheel having a trim ring and a wheel cover attached to the wheel in an overlapping relationship, where the overlapping relationship permits a continuous bright appearance across the entire outboard surface of the wheel.

2. Description of the Related Art

Wheel ornamentation and decorative overlays are widely used to enhance the aesthetic appearance of automobile wheels. Decorative overlays are used to improve the appearance of unadorned standard steel wheels and they are also used with cast aluminum wheels that are known to be expensive and difficult to plate with chromium. Examples of this technology include U.S. Pat. Nos. 5,597,213 and 5,636,906 owned by the common assignee hereof.

In general, there are several requirements for composite wheel assemblies. For example, it is important that the composite wheel assembly be capable of receiving a standard clip-on balance weight at a rim flange thereof. In addition, the composite wheel assembly should also be durable so that it will not rust or corrode. Further, it is generally desirable that any wheel ornamentation closely follow the contours of the entire outboard surface of the underlying wheel, so as to provide the visible impression that the wheel itself is chrome finished. Finally, it is desirable that the composite wheel assembly construction be as insensitive to radial dimensional tolerance stack up between the overlay and the underlying wheel, across the outboard surface of the wheel to avoid any degradation of aesthetic characteristics. In other words, it is not desirable to be required to maintain a tight tolerance between an overlay and the wheel across the outboard surface of the wheel from an outer radial surface of a rim flange to a central locating feature on a disc or web portion of the wheel. Also it is costly to have to maintain a tight tolerance between mating elements from a central locating feature of the overlay that locates on the central locating feature of the wheel to a radially outermost portion of the overlay that engages or mounts on the rim flange of the wheel.

The prior art has disclosed various trim rings and wheel covers for concealing portions of an outboard surface of a wheel. For example, U.S. Pat. No. 2,158,125 to Horn et al. discloses a vehicle wheel having novel means for attaching a cover to the wheel. The cover includes a plurality of spaced axially extending projections located at a radially outermost periphery that is substantially equal in diameter to the periphery of the wheel. The integral projections at the periphery of the cover are bent over the edge of the wheel rim for rigidly connecting the cover thereto. A hubcap snaps into a large central opening of the wheel cover and is held thereto by a spring element such that the hubcap is piloted within an inner diameter of the wheel cover to conceal the center of the wheel. Furthermore, U.S. Pat. No. 2,447,021 to Lyon discloses a cover member for a vehicle wheel that conceals a rim flange of the wheel. The cover member overlies an outer side of the rim flange and extends radially outwardly over an edge portion thereof. The cover member includes a flange at an outer part thereof that is disposed to abut an adjacent portion of a sidewall of a tire that is mounted to the rim flange. The flange includes a terminal portion that is disposed axially of the wheel to overlie the radially outer side of the tire rim. Specifically, the cover member has an outer peripheral edge and a reinforcing bead that combine to positively engage the rim flange therebetween. Accordingly, the cover member interlocks with the rim flange in a snap-on relationship. Additionally, a hubcap attaches to the wheel and abuts an inner diameter portion of the trim ring. Finally, U.S. Pat. No. 3,013,639 to Lyon discloses a composite wheel assembly having wheel cover structure with a circular radially outer U-shaped ring that opens axially inwardly toward and mounts to a lip flange of a rim flange of the wheel using stiff fingers that firmly interengage the lip flange to hold the ring thereto. An outer portion of a central hubcap abuts an inner diameter of the ring to afford full coverage of the wheel.

Unfortunately, however, the three above listed prior art references have several drawbacks. First, none of the references include wheel ornamentation that closely follows the contour of the underlying wheel. Second, it is not possible to attach standard wheel balance weights over the trim ring and rim flange of the wheel, as is presently known in the art. It is impossible to attach a standard balance weight since the trim ring does not closely follow the contour of the rim flange and is substantially offset therefrom. Finally, none of the references teach or disclose a combination of a trim ring and cladding in an overlapping relationship that is capable of taking up radial dimensional tolerance variations across the face of the wheel. Therefore, the abutting surfaces of the different elements will have varying spaces between abutting surfaces resulting in detrimental aesthetic effects.

More recent examples of composite wheel assemblies having overlays attached to an underlying wheel include U.S. Pat. No. 3,726,566 to Beith, U.S. Pat. No. 3,891,276 to Spisak, U.S. Pat. No. 5,595,423 to Heck et al., U.S. Pat. No. 5,564,791 to Chase, and U.S. Pat. No. 5,921,634 to Eikhoff. Chase teaches use of a plastic overlay for covering a wheel that extends radially outwardly to—but not covering—a flange lip of the rim flange of the wheel, so that a standard balance weight may be attached to the rim flange of the wheel. The plastic overlay cannot extend beyond or cover the flange lip of the rim flange of the wheel since the thickness of the overlay in addition to the thickness of the rim flange makes it impossible to attach a standard weight thereto. Accordingly, it is evident that the plastic overlay covers only most of the outboard surface of the wheel and a portion of the rim flange but does not cover the flange lip. The exposed flange lip circumscribing the periphery of the overlay is a clear manifestation that the wheel is cladded and not finished directly with chrome plating, thus resulting in detrimental aesthetic effects as perceived by an automobile purchaser.

In contrast, Heck et al. disclose the use of a stainless steel overlay that covers at least a portion of the outboard facing wheel surface including the flange lip of the rim flange. The overlay is preferably formed from stainless steel and adhesively attached to the wheel with an appropriate decorative surface on the outboard side of the overlay. This adhesive is applied on the outboard surface of the disc in a predetermined pattern, so that when the wheel cover is installed on the disc a smearing of the adhesive occurs over substantially the entire outboard surface of the disc. Since the adhesive covers substantially the entire interface between the wheel cover and the disc, it is effective to provide a seal and prevent water, mud, salt and other debris from entering between the wheel cover and the outboard surface of the wheel disc. At the outer peripheral edge of the rim flange is a smooth, rounded outer peripheral end and along the inboard side thereof is a circumferential, radially outwardly facing groove. The peripheral end and the groove are both formed by machining operations to a predetermined specification. The groove is formed in the inboard surface of the rim flange. The outer peripheral end portion of the wheel cover is assembled to the smooth, rounded outer peripheral end of the wheel by rolling the edge of the stainless cover over the rim flange into the radially outwardly facing groove. This technology, however, like the prior art above, has several problems.

At least one unique problem is evident in Heck et al. '423. For example, in assembling the cover to the wheel, it is clear that overbend is required to accommodate the natural springback of the end of the stainless wheel cover so as to obtain proper retention within the groove. This overbend results in frictional engagement of the outer peripheral edge of the wheel cover with the smooth, rounded outer peripheral end of the wheel. This frictional engagement results in the removal of any form of protective coatings that may be on the wheel. Removal of the protective coating causes the wheel material to be in direct contact with the stainless overlay. Accordingly, detrimental galvanic action between the stainless steel cover and the rim flange will occur over time, thereby resulting in the appearance of rust deposits on or corrosion of the rim flange. Furthermore, over a period of time, if the edge of the cover works its way out of the groove as a result of harsh vehicle turns, curb bumps, etc., the rubber tire will be exposed to this sharp edge and may result in tire damage.

Eikhoff includes much of the same teachings as Heck et al., but adds an annular locking shoulder on an outer portion of an applique or wheel cover. The annular locking shoulder interlocks behind an annular rim catch on the inner radial side of a rim flange to hold the wheel cover in place while an adhesive cures.

Similarly, Beith teaches the use of a wheel like the wheels commonly provided by manufacturers of vehicles, which is altered to create the deep recess design effect characteristic of an authentic mag wheel structure. In order to create this effect, the wheel's center 14 is joined to the tire mounting rim 21 with its outboard surface 22 facing in the direction relative to the rim 21, which is the reverse of that of a normally constructed wheel provided by the manufacturers of vehicles. The flange members 19 are secured by rivets 23 to an axially extending base flange 24 of the tire mounting rim 21 with the outboard surface 22 of the wheel center 14 facing, as represented by arrow 26 of FIG. 3, toward the conventional inboard side of the tire mounting rim 21.

Consequently, when the wheel center 14 and the tire mounting rim 21 of a commonly provided wheel 13 are joined together in this fashion, the outboard surface of the wheel center 14 is axially displaced from the terminal flange 29 a greater distance than when they are joined together in the normal manner in order to create the deep recess effect. This non-conventional wheel is covered by a wheel cover 12 of a "slotted" type, which is created by contrasting dark and light surface areas 31 and 32. This is accomplished by cutting out the dark surface areas 31 while leaving the light surface areas 32 as shown on both embodiments in the reference. The cover may be constructed of steel, aluminum, plastic, or any suitable material, which is sufficiently strong to withstand the harsh usage. The light surface areas 32 are provided by polishing or chrome plating the areas 32 while the areas 31 would be painted black to form the dark surface areas. The steel wheel cover has an outboard surface 33 with a concavely contoured shape. More specifically, the cover has a radially and axially outward and concavely curving disc center 34 which defines a central hub opening 36 registered with the hub opening 16 of the disc wheel center 14. The disc center 34 also has a plurality of circularly spaced lug apertures 37 registered with the lug bolt apertures 17 of the wheel disc center 14. The multiple flanged portion 40 is terminated at its terminal flange 42 with a lip 43 circumferentially extending about the entire periphery of the wheel cover 12. The lip 43 is formed to grip the edge of the terminal flange 29 of the multi-flange tire mounting rim 21 and, thereby, aid in fixing the wheel cover 12 to the wheel. In limited areas, an adhesive is used to bind the wheel cover 12 to the wheel 13. Alternatively, the cover can also be welded to the wheel. Beith clearly teaches that the authentically appearing and sounding wheel structure 11 can be obtained without placing adhesive therebetween. Further, additional lips 49 and 51 are provided about the peripheries of the central hub opening 36 and each of the lug apertures 37 of the wheel cover 12. Also, Beith teaches that the opening 16 and apertures 17 for the lug bolts may have to be over-sized when the additional lips 49 and 51 are provided. The lips 49 and 51 grip respectively the edges of the hub opening 16 and each lug bolt aperture 17 of the wheel and thereby further aid in fixing the wheel cover to the wheel. In the embodiment shown in FIGS. 4 through 6, the entire area of the confronting surfaces 63 and 64 are bonded together in order to provide an imitation mag wheel structure that appears to be most authentic. In such embodiment, again, lips 49 and 51 are provided to grip the peripheries of the hub opening 61 and each lug bolt aperture 62 of the wheel 13' to aid in fixing the wheel cover 12 to the wheel 13'.

Both Eikoff and Beith have several drawbacks. First, these references are devoid of teachings or disclosure that is directed to "take up" of radial dimensional tolerance variation in the overlay components across the face of the wheel. Second, the overlays involve using relatively expensive and heavy stainless steel material to cover the entire face of the wheel. Finally, since one continuous overlay is used, a two-tone chrome ring and painted cladding appearance is not possible.

Spisak discloses a wheel trim assembly for a wheel rim and disc having a plastic ornamental wheel cover attached to the rim and disc. A stainless steel trim ring having tabs extending therefrom mounts to the plastic ornamental wheel cover, wherein the tabs interlock with grooves in the plastic wheel cover. The trim ring extends radially outwardly to conceal a rim flange of the wheel. The trim ring of Spisak does not, however, closely conform to the rim flange of the wheel and therefore does not provide the visible impression that the wheel itself is chrome plated, but rather that the wheel is covered by a chrome plated trim ring.

Accordingly, what is needed is a low cost, low weight trim ring and wheel cover combination for an automobile wheel that is capable of taking up dimensional tolerance variations in the trim ring and wheel cover across the face of the wheel. As a result, styling and design flexibility would be enhanced because the overlay and trim ring would be capable of closely conforming to the contours of the wheel across the entire wheel surface, from a central locating feature to a flange lip of the rim flange. What is also needed is a trim ring and cladding combination that makes it possible to incorporate a plastic cladding for providing an attractive continuous bright appearance across the entire surface of the wheel, while still accommodating the attachment of standard wheel weights over the trim ring and rim flange of the wheel.

BRIEF SUMMARY OF THE INVENTION

According to the preferred embodiment of the present invention, there is provided a composite wheel assembly including a wheel having a trim ring and cladding assembled to the wheel. The wheel includes a disc and a rim circumscribing the disc and defining the wheel's central axis, wherein the disc and portions of the rim define an outboard surface of the wheel. The rim's radially outer periphery (or the disc's radially outer periphery in the case of a full face wheel) is defined by a rim flange. The rim flange includes an axially outboard surface, a radially inner surface, a flange lip, and a radially outer surface opposite the radially inner surface.

The trim ring is mounted to the rim flange of the wheel to cover a portion of the outboard surface of the wheel and includes a flange portion covering the axially outboard surface of the rim flange of the wheel. The trim ring further includes a lip portion extending from the flange portion, wherein the lip portion is positioned over the flange lip of the rim flange of the wheel, thereby substantially conforming to a portion of the outboard surface of the wheel. The lip portion includes a radially inner wall covering the radially inner surface of the rim flange, and further includes a radially outer wall opposite the radially inner wall and that covers the radially outer surface of the rim flange of the wheel, and also includes an axially outboard wall between the radially inner and outer walls and that covers the flange lip of the rim flange of the wheel, such that the trim ring covers at least a portion of the axially outboard surface of the wheel so as to provide a visible impression that the trim ring is actually a portion of the outboard surface of the wheel and not a separately attached component. The trim ring is preferably secured to the wheel with a thin layer of adhesive therebetween.

The cladding overlies a portion of the outboard surface of the wheel, and includes an inboard surface facing a portion of the outboard surface of the wheel. The cladding is initially secured to the wheel with either a temporary or permanent mechanical interlock that includes a temporary curing cap or permanent snap tabs extending from the cladding and interlocking into an annular detent in the disc of the wheel. The cladding is permanently secured to the wheel with an adhesive disposed therebetween. Accordingly, a portion of the cladding overlaps a portion of the trim ring so that any radial dimensional variation in the trim ring and cladding is taken up by the overlap and so as to provide a continuous bright appearance across the complete outboard surface of the wheel.

Additional embodiments of the present invention include various alternatives. For example, interlocking features on the trim ring and flange lip of the wheel may be provided to assist in retaining the trim ring to the wheel. A wheel weight bead may be provided on the lip portion of the trim ring to assist in retaining a wheel weight thereto. Further, the trim ring can overlap the cladding, such that the cladding is assembled to the wheel before the trim ring, or the cladding and trim ring are as a unit assembled to the outboard surface of the wheel.

Accordingly, it is an object of the present invention to use a plastic cladding in conjunction with a metal trim ring to cover the outboard surface of a wheel wherein standard balance weights can be attached over the trim ring and flange lip of the wheel.

It is another object to provide a composite wheel assembly that does not rust or corrode as a result of a wheel cover having scraped a wheel at a rim flange thereof during assembly of the wheel cover.

It is still another object to provide a composite wheel assembly that provides a continuous bright finish appearance across the entire face of the wheel without the expense of actually chrome plating the wheel itself and without having to extend a plastic cladding over the flange lip of the wheel.

It is a further object to provide a composite wheel assembly having multiple wheel coverings that overlap each other so as to take up the radial tolerances of each wheel covering.

It is a still a further object to provide a low cost, easy to manufacture wheel covering arrangement for a composite wheel assembly that provides aesthetic design flexibility, where a chromed plastic cladding is used with a surface treated trim ring such as chromed or anodized, a painted plastic cladding is used with a chromed or anodized trim ring, or vice versa.

These objects and other features, aspects, and advantages of this invention will be more apparent after a reading of the following detailed description, appended claims, and accompanying drawings.

DETAILED DESCRIPTION OF THE PREFERRED EMBODIMENT

Figure 1:
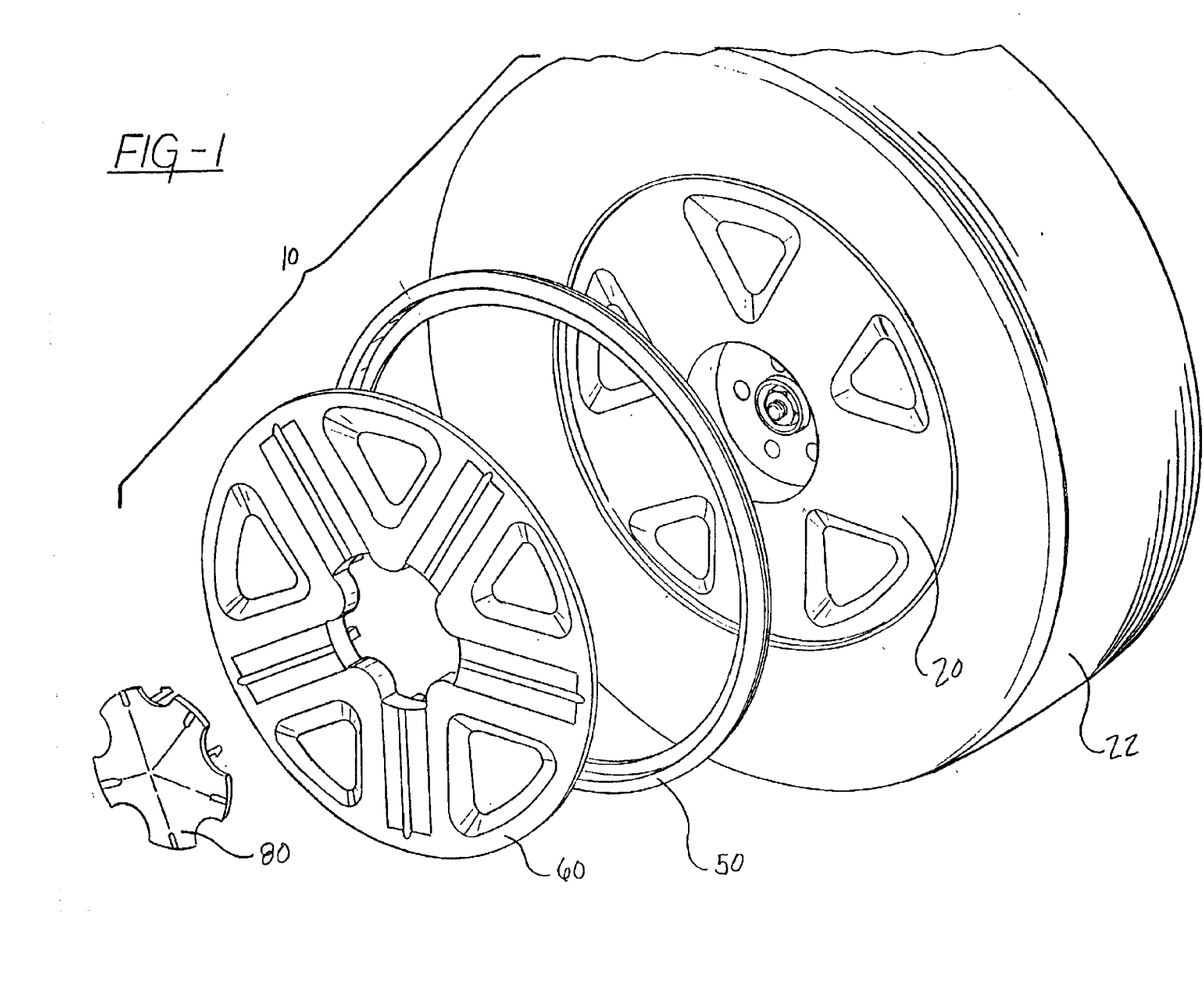
FIG. 1 is an exploded perspective view of a composite wheel assembly according to the preferred embodiment of the present invention.

Referring now in detail to the Figures, there is shown in FIG. 1 an exploded perspective view of a composite wheel assembly 10 that is constructed in accordance with the present invention. The composite wheel assembly 10 generally includes a wheel 20, a tire 22 mounted to the wheel, a trim ring 50, a cladding 60, and a hubcap 80. It is contemplated that the cladding 60 could be defined to include the portion of the composite wheel assembly 10 represented by the hubcap 80. In other words, the cladding 60 and hubcap 80 can be integrated into one cladding component, instead of being separated as shown.

For purposes of describing the preferred embodiment, the wheel 20 shown is of cast aluminum construction, but could also be of steel or magnesium construction. Where the wheel 20 is welded or assembled together, such as for a steel wheel, the wheel 20 is preferably a full face wheel, however, the invention can be used in conjunction with other types of wheel construction. For example, the wheel 20 can be a "bead seat attached", "well attached", "bimetal", "partial rim", or "modular" wheel type.

Moreover, the cladding 60 and hubcap 80 are preferably composed of chrome plated or painted high impact plastic, approximately 2 to 4 mm in thickness. Examples of materials that are preferred for the hubcap 80 and cladding 60 are discussed in U.S. Pat. No. 5,564,791 owned by the assignee hereof and incorporated by reference herein. The trim ring 50 is preferably composed of a stainless steel or aluminum alloy approximately 0.5 mm thick. Such a relatively thin trim ring 50 is applied because it is not currently feasible to mold a comparatively thick peripheral portion of a cladding around a rim flange and still accommodate standard wheel balance weights. Accordingly, the comparatively thin trim ring 50 is composed of metal and closely conforms to portions of the wheel 20.

The preferred process for making the trim ring 50 includes the following steps: providing metal stock (not shown), stamping or roll forming the stock, cutting the stock, bending the stock if required, welding ends of the stock together to establish the trim ring 50, polishing and buffing the trim ring 50, and finally Ni-Chrome plating or anodizing the trim ring 50. While the trim ring 50 is preferably surface treated with a chrome plating anodizing layer, it can alternatively can be painted, or left unfinished. The finish appearance can be a chrome finish, a painted finish, a brushed metal appearance, etc., and is not limited only to the embodiments discussed herein.

Figure 2:
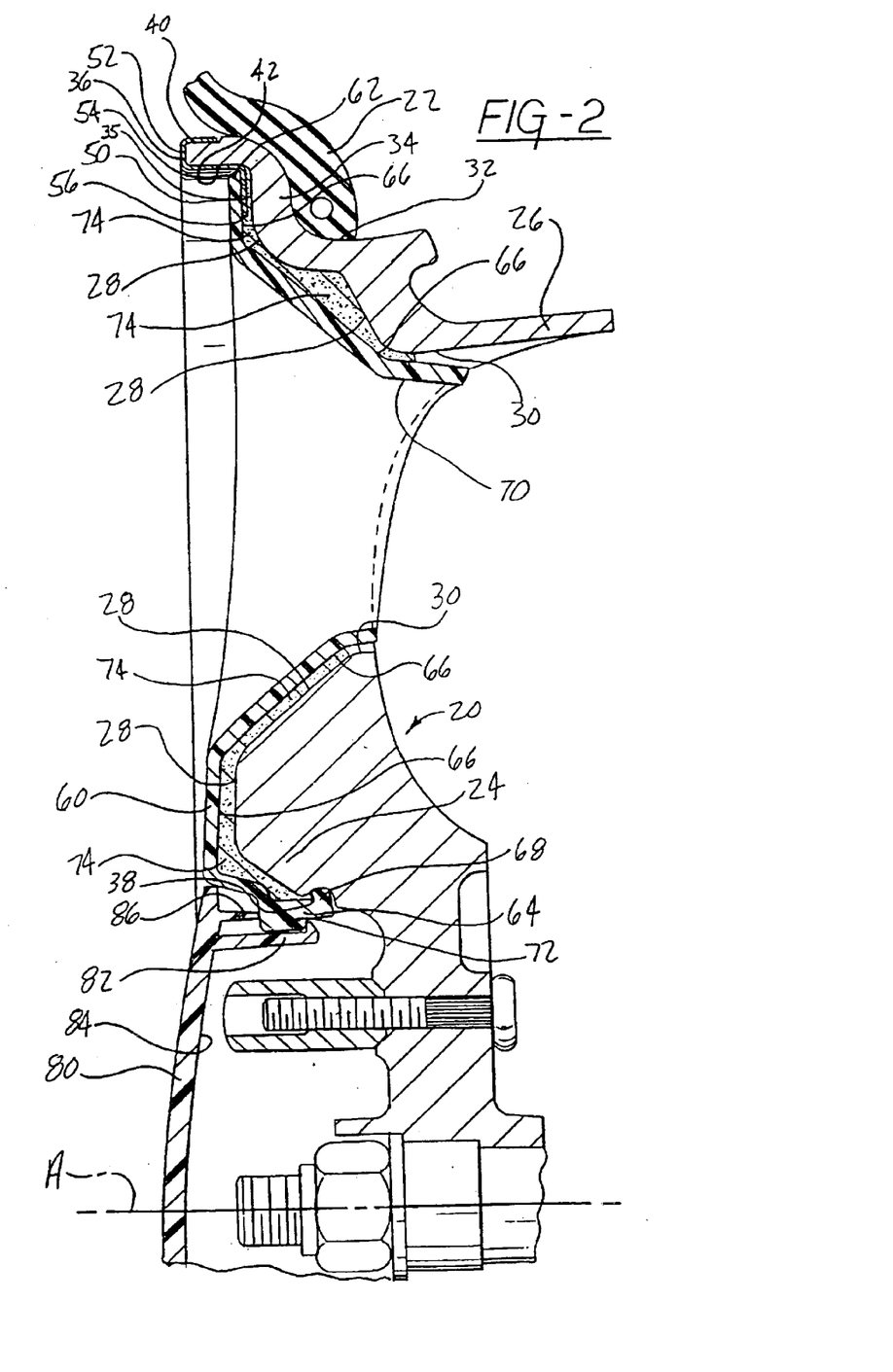
FIG. 2 is a cross-sectional view of the composite wheel assembly of FIG. 1.

FIG. 2 illustrates how the trim ring 50, cladding 60, and hubcap 80 are assembled to the wheel 20. The wheel 20 includes a spider, web, or disc 24 and a rim 26 having a rim flange 34, as are well known in the art. As mentioned above, the present invention contemplates all types of wheel construction including those with a separate disc 24 such as in a welded wheel, and those having the disc 24 integral with the rim 26 such as in a cast wheel. The disc 24 and at least some portions of the rim flange 34 together define an outboard surface 28 of the wheel 20. The disc 24 of the wheel 20 includes several vents 30 therethrough and the rim flange 34 extends from a tire bead seat 32 of the wheel 20 for supporting the tire 22 thereon. The rim flange 34 circumscribes a central axis A of the composite wheel assembly 10 that extends centrally through the disc 24. The rim flange 34 includes an axially outboard surface 35, a radially inner surface 42 extending axially outboard from the axially outboard surface 35, and a flange lip 36 substantially parallel to and away from the axially outboard surface 35.

Figures 3, 4, 5:
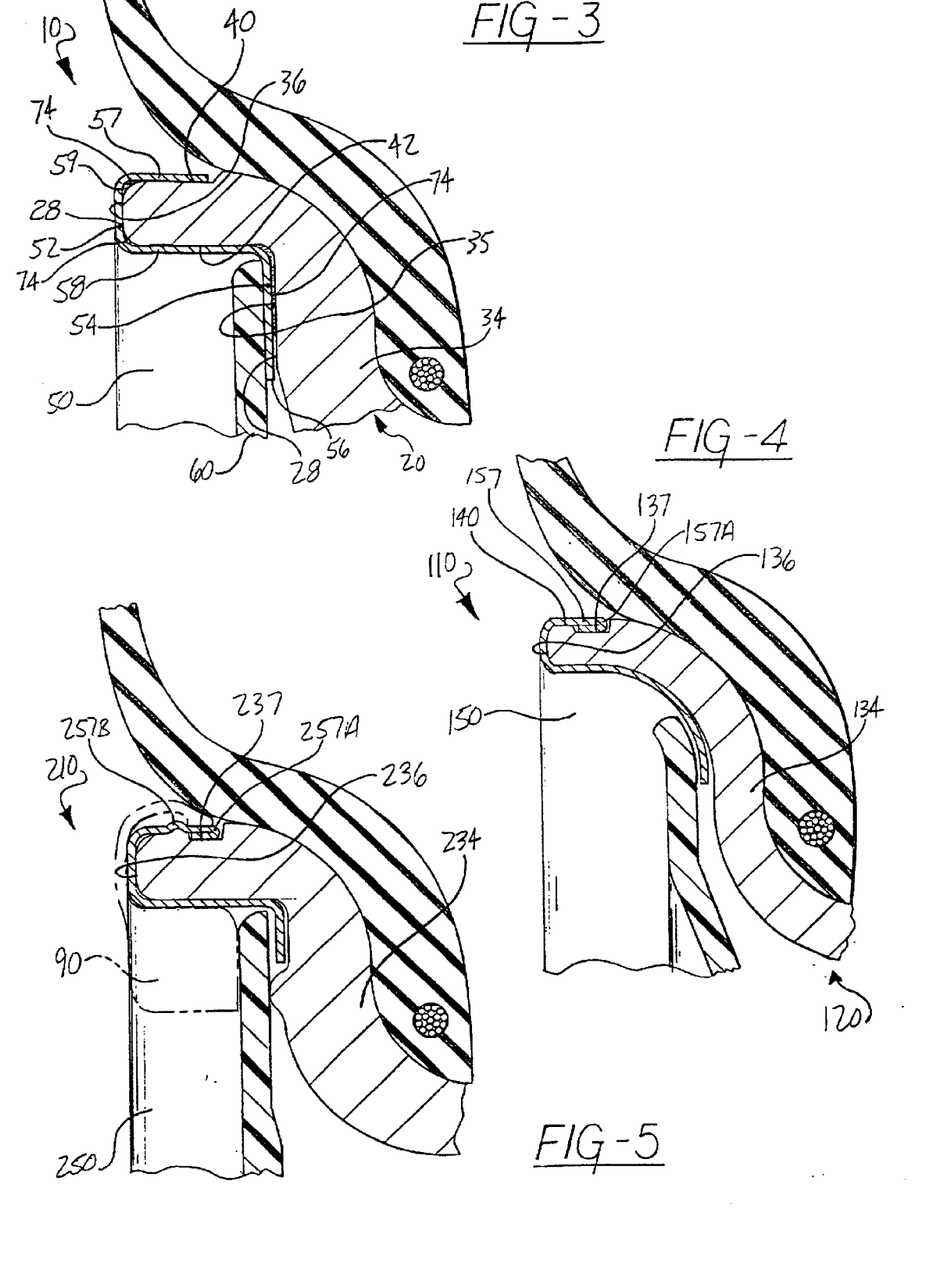
FIG. 3 is a cross-sectional view of the radial periphery of the composite wheel assembly of FIG. 2.
FIG. 4 is a cross-sectional view of the radial periphery of an alternate embodiment of the present invention showing a trim ring with a hemmed portion interlocked with a grooved rim flange.
FIG. 5 is a cross-sectional view of the radial periphery of a variation of the alternate embodiment of FIG. 4, additionally showing a bead for retaining a wheel weight to the trim ring.

Referring now to FIGS. 2 and 3, the trim ring 50 includes a U-shaped portion 52 and a flange portion 54 extending radially inwardly from the U-shaped portion 52. The U-shaped portion 52 of the trim ring 50 mounts to, or encapsulates, a portion of the rim flange 34 of the wheel 20, while the flange portion 54 of the trim ring 50 extends along the axially outboard surface 35 of the rim flange 34 with a gap therebetween. Accordingly, the trim ring 50 covers or overlays all or a portion of the flange lip 36 and axially outboard surface 35, as well as a portion of a radially outer surface 40 of the rim flange 34. In other words it is desired to substantially conform the trim ring 50 to at least a portion of the rim flange 34 of the wheel 20. Preferably, a thin layer of adhesive 74 is disposed between the trim ring 50 and the rim flange 34 to secure the trim ring 50 to the wheel 20. Alternatively, if an adhesive is not used to secure the trim ring 50 to the wheel 20, a radially outer periphery 62 of the cladding 60 overlaps the flange portion 54 of the trim ring 50 to retain the trim ring 50 to the wheel 20.

Referring again to FIG. 2, the cladding 60 is initially secured to the wheel 20 via any of a number of methods including mechanical interlocking features, a separate fast-cure adhesive, or a slave tool such as a curing cap for temporarily securing the wheel cover to the wheel until the foamed adhesive sufficiently cures. In the preferred embodiment, a central portion of the cladding 60 includes a series of concentrically disposed snap tabs 64, or projections, extending axially inwardly from an inboard surface 66 of the cladding 60 toward the disc 24 of the wheel 20. The snap tabs 64 are formed integrally with the cladding 60, have an elongated shape and have a protuberance 68 formed at a distal end of the snap tabs 64 such that the snap tabs 64 provide for a biased resilient interference fit with an annular detent 38 in the disc 24 of the wheel 20. The annular detent 38 is suited for use as a datum for accurately centering the cladding 60 on the wheel 20 and to maintain such centering until the adhesive 74 is allowed to cure and permanently attach the overlay to the wheel 20. The snap tabs 64 also serve to space the inboard surface 66 of the cladding 60 axially apart from the outboard surface 28 of the wheel 20, such that gaps are formed in which the curable, and preferably foamable, adhesive 74 is disposed between the wheel 20 and the cladding 60.

As a result, the cladding 60 mounts to the outboard surface 28 of the wheel 20 such that the cladding 60 overlaps the trim ring 50 and conforms in part to the outboard surface 28 of the wheel 20, and vents 70 in the cladding 60 align with the vents 30 of the wheel 20. The cladding 60 and trim ring 50 inherently have radial tolerances such that the location on the wheel 20 of the radially outer periphery 62 or outside diameter of the cladding 60 and a radially inner periphery 56 or inside diameter of the trim ring 50 will vary from part to part. The overlapping relationship between the trim ring 50 and cladding 60 ensures that under all tolerance stack-up conditions of the trim ring 50 and cladding 60, the trim ring 50 and cladding 60 will overlap each other to cover the entire outboard surface 28 of the wheel 20, so as to account for, absorb, or "take up" the inherent dimensional variation in the components. Thus, any radial dimensional variations in the trim ring 50 and cladding 60 are taken up by the overlap therebetween, without detriment to aesthetic appearance, so as to provide a continuous bright finish appearance across the outboard surface 28 of the wheel 20.

For example, even when the trim ring 50 and cladding 60 are produced at a minimum material condition, the radially outer periphery 62 of the cladding 60 will be located radially outward relative to the radially inner periphery 56 of the trim ring 50, as shown. This configuration permits a manufacturer to be relatively unconcerned about radial tolerances for wheel coverings and the wheel 20. In other words, it is now not necessary to produce a single wheel covering that is controlled in size and location across the entire outboard surface 28 of the wheel 20, from a central locating portion, such as the annular detent 38, to a radially outer surface 40 of the wheel 20. Additionally, it is now possible to disregard the effect of the tolerance on the dimension from the datum, or annular detent 38, to the radially outer surface 40 of the rim flange 34 of the wheel 20. Without such a two-piece take up configuration under all tolerance conditions, it would be more difficult to tightly and accurately dimension a one-piece cladding across the entire outboard surface 28 of the wheel 20 from the hub to the outer periphery so that proper alignment is obtained. Or worse yet, a gap could result between the trim ring 50 and cladding 60.

The hubcap 80 is mounted to the cladding 60 via mechanical interlocking features. A series of outer snap tabs 82 extend radially inwardly from an inboard surface 84 of the hubcap 80 and interlock with an annular shoulder 72 proximate the snap tabs 64 of the cladding 60. A standoff 86 extending axially inwardly from the hubcap 80 sets the correct axial relationship between the hubcap 80 and cladding 60.

A basic embodiment of the present invention, illustrating the outer radial periphery of the composite wheel assembly 10, is best shown in FIG. 3. The disc (not shown) is the same as that of FIG. 2 and will not be discussed in detail hereafter. The rim flange 34 includes the radially outer surface 40, a radially inner surface 42 substantially parallel to and opposite of the radially outer surface 40, and the flange lip 36 connecting therebetween. Likewise, the axially outboard surface 35 and flange lip 36 partially define the outboard surface 28 of the wheel 20. Correspondingly, the trim ring 50 includes the U-shaped portion 52 that has a radially outer wall 57 that is located to the radially outer surface 40 of the rim flange 34, a radially inner wall 58 that is mounted along the radially inner surface 42 of the rim flange 34, and an axially outboard wall 59 therebetween that is juxtaposed the flange lip 36 of the rim flange 34. The flange portion 54 of the trim ring 50 depends radially inwardly from the radially inner wall 58 of the U-shaped portion 52 of the trim ring 50.

Referring now to FIGS. 4 through 12, several additional embodiments of the present invention are set forth. Again, the disc (not shown) of the wheels in each of the embodiments is the same as that of FIG. 2 and will not be discussed in detail again hereafter. Additionally, the features of the invention that are unique to each embodiment are set forth below whereas the basic common features have been set forth in FIGS. 2 and 3 and are not discussed repeatedly in detail hereafter. As with the embodiment of FIGS. 2 and 3, a variety of adhesives may be used to adhere the trim rings and claddings of the various embodiments either to one another or to the wheels of the various embodiments.

FIG. 4 illustrates a composite wheel assembly 110 with a mechanical interlock between a trim ring 150 and a rim flange 134 of a wheel 120. The rim flange 134 includes an annular groove 137, or recess, formed in a radially outer surface 140 thereof. The annular groove 137 receives an annular hem 157A, or projection, that terminates a radially outer wall 157 of the trim ring 150. Accordingly, as the trim ring 150 is mounted to the wheel 120, the annular hem 157A interlocks into the annular groove 137 to retain the trim ring 150 to the wheel 120 and to cover a flange lip 136 of the wheel 120.

Similarly, FIG. 5 illustrates a composite wheel assembly 210 having a similar annular hem 257A and annular groove 237 mechanical interlocking arrangement. Additionally, FIG. 5 shows a trim ring 250 having an annular wheel weight bead 257B for a wheel weight 90 (shown in phantom) to engage therewith. As such, the wheel weight 90 mounts over a flange lip 236 of a rim flange 234 and trim ring 250 and interlocks with the wheel weight bead 257B.

Figure 6:
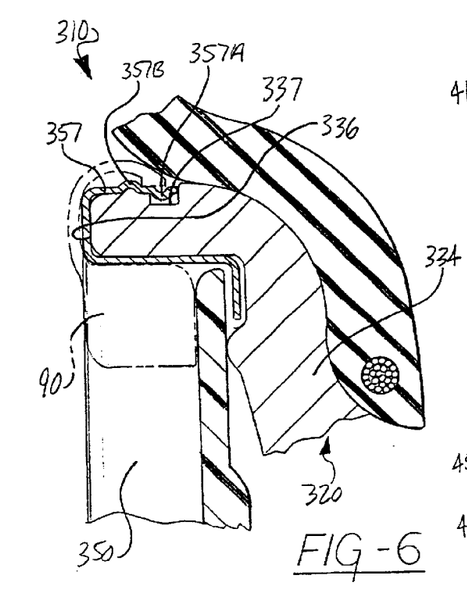
FIG. 6 is a cross-sectional view of the radial periphery of yet another variation of the alternate embodiment of FIG. 4, showing the trim ring with a beaded portion interlocked with the grooved rim flange.

Likewise, FIG. 6 illustrates a composite wheel assembly 310 with an annular groove 337 in a rim flange 334 of a wheel 320. Similar to FIG. 5, an annular bead 357A formed in a radially outer wall 357 of a trim ring 350 interlocks within the annular groove 337 to retain the trim ring 350 to the wheel 320 and to cover a flange lip 336 of the wheel 320. An annular wheel weight bead 357B is also formed in the radially outer wall 357 of the trim ring 350 to provide an anchoring feature for the wheel weight 90 (shown in phantom).

Figure 7:
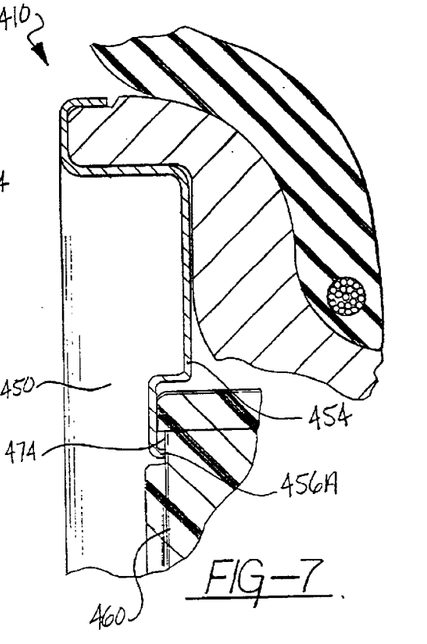
FIG. 7 is a cross-sectional view of the radial periphery of another alternate embodiment of the present invention showing a trim ring interlocked with and overlapping the radial outer portion of a cladding.

FIG. 7 illustrates a composite wheel assembly 410 having a trim ring 450 that overlaps a cladding 460. An annular groove 474 in the cladding 460 receives an annular tab 456A formed in the flange portion 454 of the trim ring 450. The annular groove 474 is sized to accept the annular tab 456A to accommodate any radial tolerance stack up condition between the trim ring 450 and cladding 460. A thin layer of adhesive (not shown) is disposed between the trim ring 450 and cladding 460.

Figure 8:
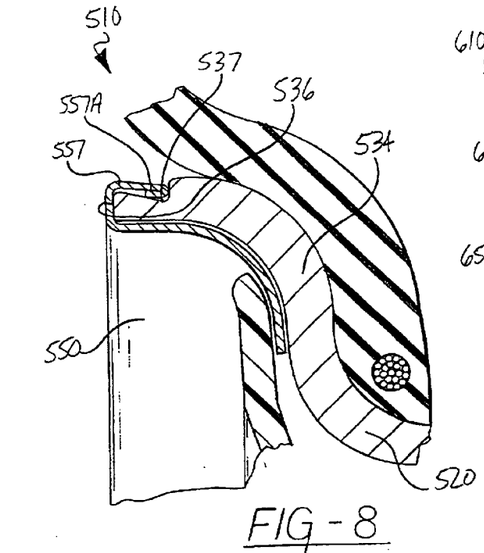
FIG. 8 is a cross-sectional view of the radial periphery of a further alternate embodiment of the present invention showing a trim ring with a hemmed portion interlocked with a tapered portion of a rim flange.

FIG. 8 illustrates another embodiment of a composite wheel assembly 510 where a wheel 520 includes a tapered relief 537 formed in a rim flange 534 thereof. A hem portion 557A terminates a radially outer wall 557 of a trim ring 550, where the radially outer wall 557 is also tapered radially inwardly so as to frictionally engage the rim flange 534 upon assembly of the trim ring 550 to the wheel 520 and to cover a flange lip 536 of the wheel 520.

Figure 9:
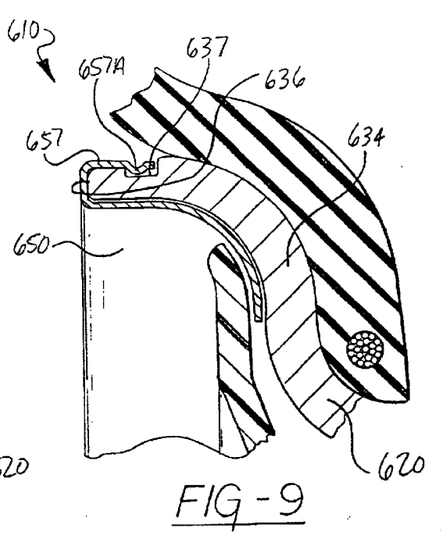
FIG. 9 is a cross-sectional view of the radial periphery of a variation of the alternate embodiment of FIG. 6 without the wheel weight retaining bead.

FIG. 9 illustrates a composite wheel assembly 610 with a trim ring 650 having an annular bead 657A formed in a radially outer wall 657 that interlocks into an annular groove 637 in a rim flange 634 of the wheel 620 for covering a flange lip 636 in the rim flange 634.

Figure 10:
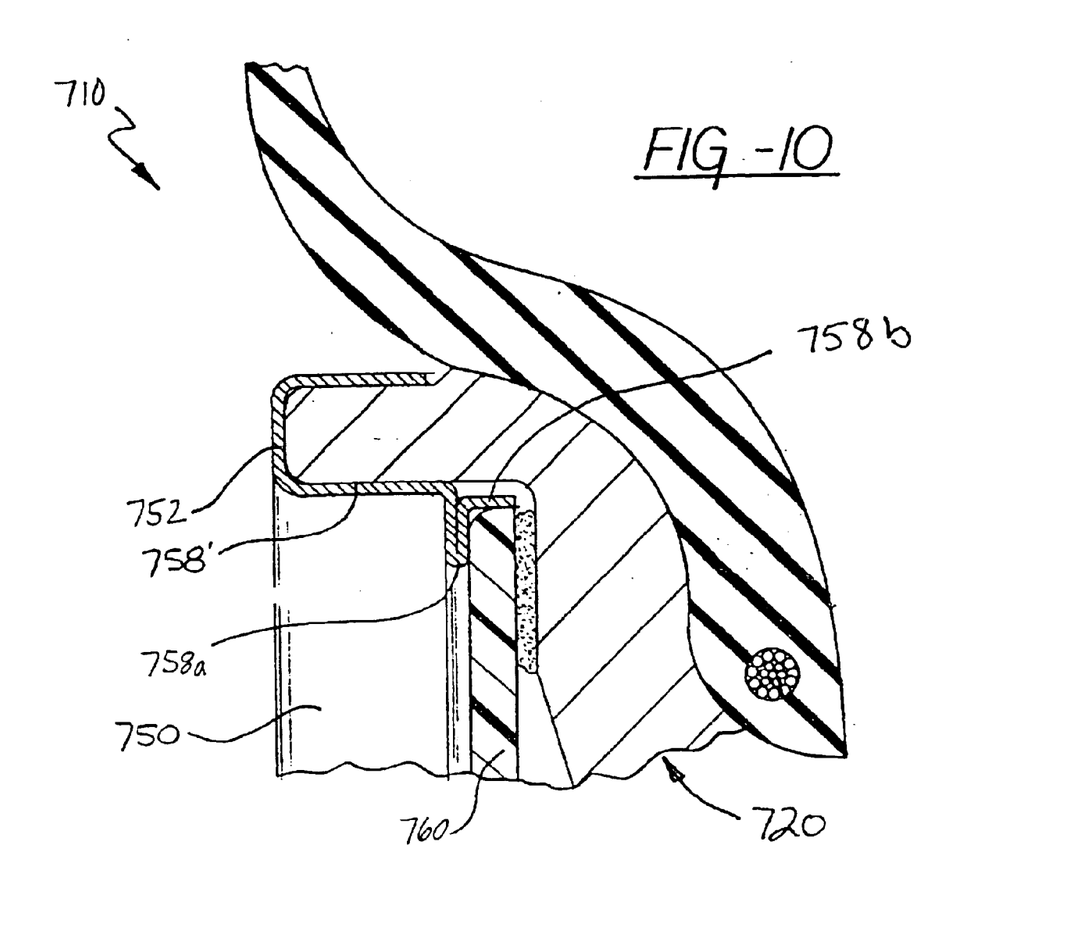
FIG. 10 is a cross-sectional view of the radial periphery of an embodiment alternative to that of FIG. 7 and showing a trim ring having a radially inwardly projecting portion overlapping a radially outer portion of a cladding.

FIG. 10 illustrates a composite wheel assembly 710 having a trim ring 750 with a portion thereof that overlaps a cladding 760. The cladding 760 is largely similar to that shown in the preferred embodiment of FIG. 3 and, therefore, will not be further discussed here. The trim ring 750, however, is somewhat different from that of the preferred embodiment. A lip portion 752 includes a radially inner wall 758 that has a bend or radial projection 758A formed therein that terminates in a rack tab 758B.

The radial projection 758A overlays or caps over the radially outer portion of the cladding 760 as clearly shown in FIG. 10. Thus, by using the trim ring 750, the "bright look" is uninterrupted from the cladding 760 to the radially outer portion of the composite wheel assembly 710. Additionally, unlike the embodiment of FIG. 7, there are no mechanical interlocking features or intercooperating grooves or tabs required. Thus, this embodiment is less tolerance sensitive in comparison to the embodiment of FIG. 7. The rack tab 758B is provided as an area for racking or gripping the trim ring 750 during the plating process of the trim ring 750. Finally, a thin layer of adhesive (not shown) is disposed between the trim ring 750 and wheel 720.

Figure 11:
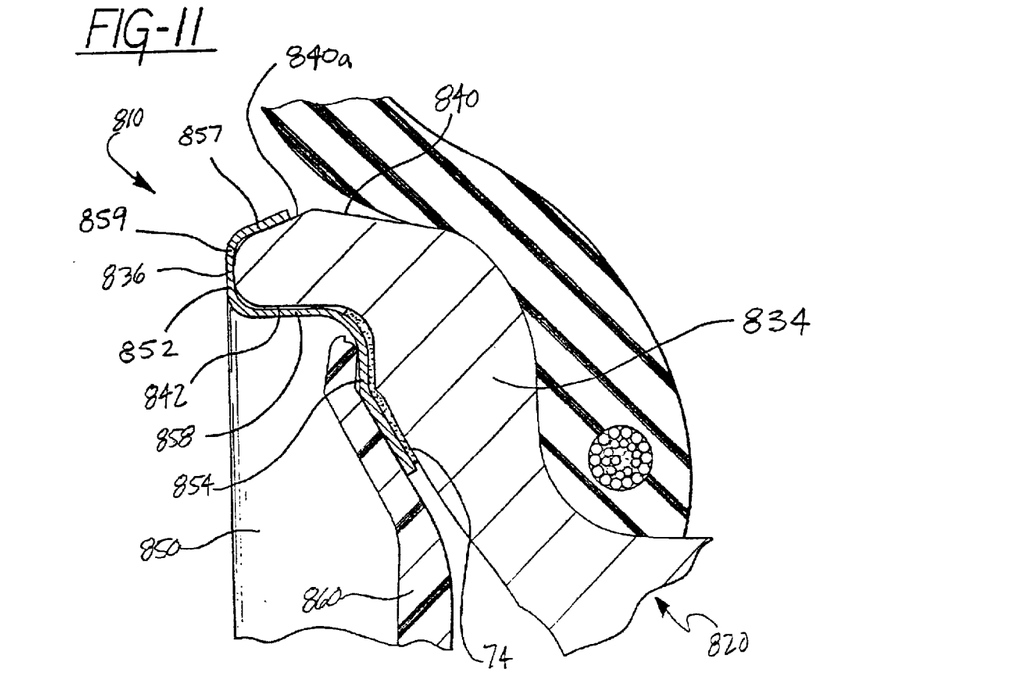
FIG. 11 is a cross-sectional view of the radially outer periphery of a composite wheel assembly wherein a bevel is provided on a rim flange.

FIG. 11 illustrates a composite wheel assembly 810 having a wheel 820 with a cladding 860 with a portion thereof that overlaps a portion of a trim ring 850 as similarly described previously. A rim flange 834 of the wheel 820 includes a radially outer surface 840, a radially inner surface 842, and a flange lip 836 therebetween. Uniquely, the radially outer surface 840 is chamfered to provide a bevel 840A thereon for ease of assembling the trim ring 850 to the wheel 820. Correspondingly, the trim ring 850 includes a lip portion 852 having a radially outer wall 857 that is juxtaposed the bevel 840A of the rim flange lip 834, a radially inner wall 858 that is juxtaposed the radially inner surface 842 of the flange lip 836, and an axially outboard wall 859 therebetween that is juxtaposed the flange lip 836 of the rim flange 834. A flange portion 854 depends radially inwardly from the radially inner wall 858 of the lip portion 852 of the trim ring 850. Advantageously, due to the bevel configuration, the trim ring 850 does not frictionally engage or scrape the flange lip 836 as discussed previously in relation to the Heck et al. reference.

Figure 12:
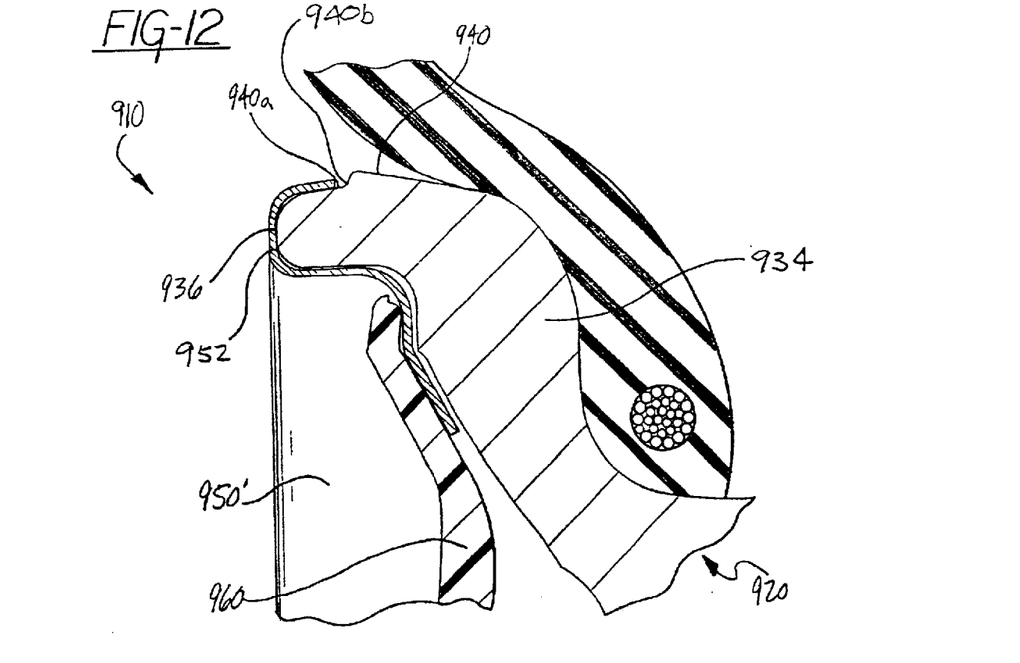
FIG. 12 is a cross-sectional view of an alternative to that of FIG. 11 wherein a bevel is provided on the rim flange.

Similarly, FIG. 12 illustrates a composite wheel assembly 910 as the preferred embodiment and a variation on the embodiment shown in FIG. 11. Here a rim flange 934 of a wheel 920 includes a radially outer surface 940 that is also chamfered to include a bevel 940A for ease of assembling a trim ring 950 to the wheel 920. A shoulder portion 940B is defined between the bevel 940A and the radially outer surface 940 of the rim flange 934. The radially outer surface 940 is not fully chamfered in order to protect the trim ring 950 from damage when a wheel balance weight (not shown) is removed from the rim flange 934 of the wheel 920.

Referring in general to all of the Figures, the composite wheel assembly is produced in accordance with a preferred method of producing the present invention. First, the wheel, trim ring, cladding, and hubcap are provided, as described above. Preferably, a thin layer of adhesive is applied to one portion of the outboard surface of the wheel that interfaces with the trim ring. The trim ring is already preformed as discussed above and is therefore pushed onto the wheel. In other words, the U-shaped portion of the trim ring is aligned with the flange lip of the wheel and is mounted in an axial direction to the wheel so that the U-shaped portion encapsulates the flange lip and the flange portion conceals a portion of the axially outboard surface. As such, the trim ring covers the flange lip and axially outboard surface of the wheel.

The cladding is assembled to the wheel such that the snap tabs pilot to and interlock with the annular detent of the wheel to temporarily secure the cladding thereto. To permanently secure the cladding to the wheel, a thicker layer or mass of thick foam adhesive is then injected into predetermined spaces between the cladding and the wheel as is well known in the art.

One of the steps of assembling either the trim ring to the wheel or the cladding to the wheel steps includes overlapping a portion of one of the trim ring and the cladding over a portion of the other of the trim ring and the cladding. As a result of placing the trim ring and cladding to the wheel, the cladding overlaps the trim ring at the radially outer periphery of the cladding and at the radially inner periphery of the trim ring. As an alternative, the cladding could be assembled to the wheel first and then the trim ring assembled to the wheel such that a portion of the trim ring overlaps a portion of the cladding. Accordingly, the trim ring and cladding overlap each other in a complementary relationship, so that any radial dimensional variation in the trim ring and the cladding is taken up by the overlapping complementary relationship.

From the above, it can be seen that a significant advantage of the present invention is that the composite wheel assembly will accept standard balance weights to be readily and reliably mounted to the rim flange of the wheel, so as to permit proper balancing of the composite wheel assembly. To achieve the latter, a comparatively thin gage trim ring is mounted to the rim flange for enabling attachment of a standard weight, while a comparatively thick cladding is mounted to the disc of the wheel.

Another advantage is that the trim ring assembles easily to the rim flange of the wheel and does not scrape the rim flange with an exposed edge thereby leading to rust or corrosion of the rim flange.

Yet another advantage is that the cladding and trim ring combination provides an aesthetically pleasing, permanently attached ornamental cover to the wheel without the appearance of being a separately manufactured attachment to the wheel. The cladding and trim ring closely conform to the contours of the wheel outboard surface such that the chrome finish appears to be directly on the wheel. As a result, the aesthetic structural geometry of the composite wheel is provided by the wheel outboard surface, while the bright reflective effect is provided by the hubcap, cladding, and trim ring combination, across the entire outboard surface of the wheel. The brightness of the cladding and trim ring combination is even brighter than either chrome plated stainless steel overlays or chrome-plated cast wheels. Thus, the present invention provides another option for automotive stylists to incorporate into their design palette.

Still another advantage is that the tire can be removed and remounted without hindering the cladding and trim ring since the cladding and trim ring combination has a low, out-of-the-way profile at the flange lip of the wheel.

A further advantage is that the cladding and trim ring combination includes a multitude of finishing possibilities including a surface treated look including an all chrome or anodized look with a chrome plated or anodized trim ring and cladding, or a two-tone look with a chrome or anodized trim ring and painted cladding or vice versa. Additionally, a rigid plastic cladding can have geometry that conforms closely to the outboard surface of the wheel or, alternatively, that can deviate therefrom to enable wheel designers added flexibility to create their own wheel outboard surface geometry.

Yet a further advantage is that the composite wheel assembly absorbs or takes up tolerance variation between a combination of overlay components and the outboard surface of the wheel.

While the present invention has been described in terms of a preferred embodiment, it is apparent that other forms could be adopted by one skilled in the art. For example, those skilled in the art will recognize that the definition of cladding is broad enough to encompass a separate two-piece cladding panel and hubcap combination, as well as an integral one-piece component integrating a hubcap and cladding panel into one. Additionally, those skilled in the art will appreciate that other applications, including those outside of the automotive industry, are possible with this invention. Accordingly, the scope of the present invention is to be limited only by the following claims.

What is claimed is:

1. A composite wheel assembly comprising:

a wheel having an outboard surface thereon, said wheel further having a disc portion and a rim portion circumscribing said disc portion, said rim portion terminating in a rim flange having a flange lip at an axially outermost portion thereof, said rim flange further having a radially inner surface and a radially outer surface substantially opposite said radially inner surface, said flange lip connecting said radially inner and outer surfaces;

a trim ring mounted to said wheel, said trim ring having a flange portion covering at least a portion of said outboard surface of said wheel, and a U-shaped portion extending from said flange portion, said U-shaped portion having a radially outer wall covering at least a portion of said radially outer surface of said rim flange of said wheel, said U-shaped portion further having a radially inner wall covering said radially inner surface of said rim flange of said wheel, said U-shaped portion further having a lip portion extending from said radially outer wall to said radially inner wall of said trim ring whereby said trim ring covers at least a portion of said outboard surface and said rim flange to create a visible impression that said trim ring is an integral portion of said outboard surface of said wheel and not a separately attached component;

a cladding secured to at least a portion of said outboard surface of said wheel, said cladding having a radially outermost periphery; and an annular detent provided in said disc of said wheel; and a plurality of protuberances extending axially inwardly from said inboard surface of said cladding, each of said plurality of protuberances resiliently engaging said annular detent of said disc of said wheel so as to secure said cladding to said outboard surface of said wheel, said plurality of protuberances causing said cladding to be centrally located with respect to said rim flange of said wheel and spaced from said outboard surface of said wheel so as to define at least one gap therebetween means for securing said trim ring to said wheel;

said trim ring and said cladding being in an overlapping relationship in a radial direction wherein said flange portion of said trim ring and said radially outer periphery of said cladding overlap.

2. The composite wheel assembly as claimed in claim 1, wherein said means for securing said trim ring to said wheel comprises an adhesive deposited between said trim ring and said wheel.

3. The composite wheel assembly as claimed in claim 1, further comprising an adhesive deposited between said cladding and said wheel.

4. The composite wheel assembly as claimed in claim 1, wherein said means for securing said trim ring to said wheel further comprises an interlocking portion on said rim flange of said wheel and a complementary interlocking portion on said trim ring.

5. The composite wheel assembly as claimed in claim 4, wherein said interlocking portion of said trim ring comprises an annular hem formed in said radially outer wall of said U-shaped portion of said trim ring and said interlocking portion of said rim flange of said wheel comprises an annular groove in said radially outer surface of said rim flange, whereby said annular hem engages said annular groove for securing said trim ring to said wheel.

6. The composite wheel assembly as claimed in claim 4, wherein said interlocking portion of said trim ring comprises an annular bead in said radially outer wall of said U-shaped portion of said trim ring and said interlocking portion of said rim flange of said wheel comprises an annular groove in said radially outer surface of said rim flange, whereby said annular bead engages said annular groove for securing said trim ring to said wheel.

7. The composite wheel assembly as claimed in claim 4, wherein said interlocking portion of said trim ring comprises a hem portion in said radially outer wall of said U-shaped portion of said trim ring, and said interlocking portion of said rim flange of said wheel comprises a tapered portion of said radially outer surface, said tapered portion being configured to slope in a radially inwardly and axially inboard direction whereby said hem portion of said trim ring grippingly engages said tapered portion of said rim flange of said wheel.

8. The composite wheel assembly as claimed in claim 1, wherein said radially outer surface of said rim flange is beveled to slope in a radially inwardly and axially outboard direction.

9. The composite wheel assembly as claimed in claim 1, wherein said radially outer surface of said rim flange has a shoulder portion and is beveled to slope in a radially inwardly and axially outboard direction from said shoulder portion.

10. The composite wheel assembly as claimed in claim 1, wherein said radially outer wall of said U-shaped portion of said trim ring has a wheel weight bead for retaining a wheel weight thereto.

11. The composite wheel assembly as claimed in claim 1, wherein at least a portion of said cladding overlaps at least a portion of said trim ring.

12. The composite wheel assembly as claimed in claim 1, wherein at least a portion of said trim ring overlaps at least a portion of said cladding.

13. The composite wheel assembly as claimed in claim 12, wherein said at least a portion of said trim ring has a radial projection that overlaps said at least a portion of said cladding.

14. The composite wheel assembly as claimed in claim 13, wherein said radially inner wall of said U-shaped portion of said trim ring terminates in an axially extending tab portion.

15. The composite wheel assembly as claimed in claim 12, wherein said cladding has an annular groove and said trim ring has a complementary annular projection adapted to interlock with said annular groove.

16. The composite wheel assembly as claimed in claim 1, wherein one of said trim ring and said cladding is surface treated and the other of said trim ring and said cladding is painted so as to provide a two-tone appearance to said wheel.

17. The composite wheel assembly as claimed in claim 1, wherein said trim ring is composed of stainless steel and said cladding is composed of plastic.

18. The composite wheel assembly as claimed in claim 1, wherein said trim ring is composed of an aluminum alloy and said cladding is composed of plastic.

* * * * *